US010255593B1

(12) United States Patent
Quigley

(10) Patent No.: US 10,255,593 B1
(45) Date of Patent: *Apr. 9, 2019

(54) PASSCODE ENTRY THROUGH MOTION SENSING

(71) Applicant: Square, Inc., San Francisco, CA (US)

(72) Inventor: Oliver S. C. Quigley, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,782

(22) Filed: Feb. 28, 2017

Related U.S. Application Data

(63) Continuation of application No. 14/140,790, filed on Dec. 26, 2013, now Pat. No. 9,613,353.

(51) Int. Cl.
G06Q 40/00 (2012.01)
G06Q 20/32 (2012.01)
G06Q 20/40 (2012.01)

(52) U.S. Cl.
CPC ..... *G06Q 20/3224* (2013.01); *G06Q 20/3226* (2013.01); *G06Q 20/405* (2013.01)

(58) Field of Classification Search
CPC .................................................. G06Q 20/3224
USPC ...................................................... 705/35–45
See application file for complete search history.

(56) References Cited

U.S. PATENT DOCUMENTS

| 5,832,206 | A | 11/1998 | De Jesus et al. |
| 5,940,511 | A | 8/1999 | Wilfong |
| 6,257,486 | B1 | 7/2001 | Teicher et al. |
| 6,313,838 | B1 | 11/2001 | Deering |
| 6,373,499 | B1 | 4/2002 | Acker |
| 6,543,684 | B1 | 4/2003 | White et al. |
| 6,669,100 | B1 | 12/2003 | Rogers et al. |

(Continued)

FOREIGN PATENT DOCUMENTS

| AU | 2018203297 A1 | 5/2018 |
| WO | 2015/048041 A1 | 4/2015 |

(Continued)

OTHER PUBLICATIONS

Bibliography: Cai, L., Chen, H.: Touchlogger: inferring keystrokes on touch screen from smartphone motion. In: Proceedings of the 6th USENIX Conference on Hot Topics in Security, HotSec 2011, p. 9 (2011).*

(Continued)

*Primary Examiner* — Chia-Yi Liu
(74) *Attorney, Agent, or Firm* — Mattingly & Malur, PC

(57) ABSTRACT

Some examples include determining a plurality of motion pattern readings detected by an electronic device in conjunction with entry of a passcode on the electronic device, such as for authentication of a transaction. The passcode may be entered as a sequence of tactile presses on the electronic device, and the detected motion pattern readings may be indicative of movements of the electronic device when the tactile presses occur. Based at least in part on the motion pattern readings, a plurality of locations corresponding to the tactile presses may be determined. Further, based at least in part on the determined plurality of locations, symbols for the passcode may be determined. In some cases, a process for authenticating the transaction may be initiated using the determined passcode.

20 Claims, 7 Drawing Sheets

(56) References Cited

U.S. PATENT DOCUMENTS

| | | |
|---|---|---|
| 6,771,877 B1 | 8/2004 | Ono et al. |
| 6,836,313 B2 | 12/2004 | Ishizaki |
| 7,484,173 B2 | 1/2009 | Gao et al. |
| 8,231,055 B2 | 7/2012 | Wen |
| 8,392,935 B2 | 3/2013 | Grabowski |
| 8,500,018 B2 | 8/2013 | McKelvey et al. |
| 8,632,002 B2 | 1/2014 | Boutcher et al. |
| 8,711,116 B2 | 4/2014 | Papakipos et al. |
| 8,850,216 B1 | 9/2014 | Mikhailov et al. |
| 8,914,884 B1 | 12/2014 | Kogan et al. |
| 9,230,254 B1 | 1/2016 | Sharifi Mehr |
| 9,346,282 B2 | 5/2016 | Page et al. |
| 9,430,635 B2 | 8/2016 | Dai Zovi |
| 9,483,653 B2 | 11/2016 | Dai Zovi |
| 9,489,354 B1 | 11/2016 | Lee et al. |
| 9,613,353 B1 | 4/2017 | Quigley |
| 9,619,802 B1 | 4/2017 | Dai Zovi et al. |
| 9,632,614 B2 | 4/2017 | Howard et al. |
| 9,858,432 B2 | 1/2018 | Dai Zovi |
| 9,965,654 B2 | 5/2018 | Dai Zovi |
| 2003/0014372 A1 | 1/2003 | Wheeler et al. |
| 2003/0182558 A1 | 9/2003 | Lazzaro et al. |
| 2003/0235452 A1 | 12/2003 | Kraus et al. |
| 2004/0057600 A1 | 3/2004 | Niwa |
| 2004/0151385 A1 | 8/2004 | Oneda et al. |
| 2004/0257238 A1 | 12/2004 | De Jongh |
| 2004/0268148 A1 | 12/2004 | Karjala et al. |
| 2005/0074117 A1 | 4/2005 | Tanaka et al. |
| 2005/0114395 A1 | 5/2005 | Muralidharan |
| 2005/0213766 A1 | 9/2005 | Goss |
| 2005/0228724 A1 | 10/2005 | Frangiosa |
| 2006/0202797 A1 | 9/2006 | Theis et al. |
| 2006/0224523 A1 | 10/2006 | Elvitigala |
| 2006/0242421 A1 | 10/2006 | Hsu |
| 2007/0016792 A1 | 1/2007 | Allen, Jr. et al. |
| 2007/0051808 A1 | 3/2007 | Adams et al. |
| 2007/0058843 A1 | 3/2007 | Theis et al. |
| 2007/0154018 A1 | 7/2007 | Watanabe |
| 2007/0183000 A1 | 8/2007 | Eisen et al. |
| 2008/0008314 A1 | 1/2008 | Dempski et al. |
| 2008/0060052 A1 | 3/2008 | Hwang et al. |
| 2008/0110981 A1 | 5/2008 | DeLine et al. |
| 2008/0148186 A1 | 6/2008 | Krishnamurthy |
| 2008/0168546 A1 | 7/2008 | Almeida |
| 2008/0192047 A1 | 8/2008 | Radzikowski et al. |
| 2008/0209212 A1 | 8/2008 | Ditzman et al. |
| 2008/0258940 A1 | 10/2008 | Ding et al. |
| 2008/0283590 A1 | 11/2008 | Oder, II et al. |
| 2008/0301767 A1 | 12/2008 | Picard et al. |
| 2009/0044282 A1 | 2/2009 | Govindaraju |
| 2009/0060334 A1 | 3/2009 | Rayner |
| 2009/0254994 A1 | 10/2009 | Waterson |
| 2010/0109920 A1 | 5/2010 | Spradling |
| 2010/0134248 A1 | 6/2010 | Adams et al. |
| 2010/0134328 A1 | 6/2010 | Gutowitz et al. |
| 2010/0134624 A1 | 6/2010 | Bobbitt et al. |
| 2010/0153270 A1 | 6/2010 | Hawkes |
| 2010/0180120 A1 | 7/2010 | Frenkel et al. |
| 2010/0259560 A1 | 10/2010 | Jakobson et al. |
| 2010/0262835 A1 | 10/2010 | Joffray |
| 2011/0042455 A1 | 2/2011 | Lu et al. |
| 2011/0064383 A1 | 3/2011 | Bauchot et al. |
| 2011/0185319 A1 | 7/2011 | Carapelli |
| 2011/0189981 A1* | 8/2011 | Faith .................... G06F 1/1694 |
| | | 455/414.1 |
| 2011/0225406 A1 | 9/2011 | Nelson et al. |
| 2012/0042364 A1 | 2/2012 | Hebert |
| 2012/0104090 A1 | 5/2012 | Gross |
| 2012/0249408 A1 | 10/2012 | Moliton |
| 2012/0268393 A1 | 10/2012 | Lee |
| 2012/0299831 A1 | 11/2012 | Lioy |
| 2012/0308075 A1 | 12/2012 | Takenaka et al. |
| 2012/0317628 A1 | 12/2012 | Yeager |
| 2012/0323788 A1 | 12/2012 | Keresman, III et al. |
| 2013/0033523 A1 | 2/2013 | Stovicek et al. |
| 2013/0050091 A1 | 2/2013 | Ge et al. |
| 2013/0067228 A1 | 3/2013 | Dewan et al. |
| 2013/0086389 A1 | 4/2013 | Suwald |
| 2013/0091583 A1 | 4/2013 | Karroumi et al. |
| 2013/0100182 A1 | 4/2013 | Yeh et al. |
| 2013/0127857 A1 | 5/2013 | Carr et al. |
| 2013/0139248 A1* | 5/2013 | Rhee .................... G06F 3/0346 |
| | | 726/19 |
| 2013/0144792 A1* | 6/2013 | Nilsson ................. G06Q 20/20 |
| | | 705/67 |
| 2013/0145475 A1 | 6/2013 | Ryu et al. |
| 2013/0159196 A1 | 6/2013 | DiZoglio |
| 2013/0162679 A1 | 6/2013 | Kim et al. |
| 2013/0194301 A1 | 8/2013 | Robbins et al. |
| 2013/0205387 A1* | 8/2013 | Le ........................ G06F 21/316 |
| | | 726/19 |
| 2013/0207902 A1 | 8/2013 | Showering |
| 2013/0276019 A1 | 10/2013 | Liu |
| 2013/0301830 A1 | 11/2013 | Bar-El et al. |
| 2013/0320080 A1 | 12/2013 | Olson et al. |
| 2013/0333011 A1 | 12/2013 | Quigley et al. |
| 2014/0025579 A1 | 1/2014 | Nilsson |
| 2014/0028566 A1 | 1/2014 | Gupta |
| 2014/0040633 A1 | 2/2014 | Leleu |
| 2014/0095387 A1 | 4/2014 | Colnot |
| 2014/0096201 A1 | 4/2014 | Gupta |
| 2014/0100973 A1 | 4/2014 | Brown et al. |
| 2014/0129445 A1 | 5/2014 | Yang |
| 2014/0149749 A1 | 5/2014 | Wang |
| 2014/0188734 A1 | 7/2014 | Neuwirth |
| 2014/0191994 A1 | 7/2014 | Chung |
| 2014/0194061 A1 | 7/2014 | Fine |
| 2014/0196158 A1 | 7/2014 | Buck |
| 2014/0201831 A1 | 7/2014 | Yi et al. |
| 2014/0229744 A1 | 8/2014 | Doumen |
| 2014/0282204 A1 | 9/2014 | Park et al. |
| 2014/0289130 A1 | 9/2014 | Savolainen et al. |
| 2014/0324708 A1 | 10/2014 | McCauley et al. |
| 2014/0327630 A1 | 11/2014 | Burr et al. |
| 2014/0351739 A1 | 11/2014 | Leger |
| 2014/0380452 A1 | 12/2014 | Suwald |
| 2015/0006405 A1 | 1/2015 | Palmer et al. |
| 2015/0007265 A1 | 1/2015 | Aissi et al. |
| 2015/0039883 A1 | 2/2015 | Yoon et al. |
| 2015/0073983 A1 | 3/2015 | Bartenstein et al. |
| 2015/0137944 A1 | 5/2015 | Fuerth |
| 2015/0154414 A1 | 6/2015 | Pike |
| 2015/0186857 A1 | 7/2015 | Swinfen |
| 2015/0199527 A1 | 7/2015 | Picon |
| 2015/0234757 A1 | 8/2015 | You et al. |
| 2015/0243258 A1 | 8/2015 | Howe |
| 2015/0253925 A1 | 9/2015 | Nakao et al. |
| 2015/0261968 A1 | 9/2015 | Polyachenko |
| 2015/0287009 A1 | 10/2015 | Crowley et al. |
| 2015/0371213 A1 | 12/2015 | Pike |
| 2016/0050069 A1 | 2/2016 | Griffin et al. |
| 2016/0110714 A1 | 4/2016 | Norland |
| 2016/0142202 A1 | 5/2016 | Dai Zovi |
| 2016/0155111 A1 | 6/2016 | Arnald et al. |
| 2017/0169412 A1 | 6/2017 | Dai Zovi et al. |

FOREIGN PATENT DOCUMENTS

| | | |
|---|---|---|
| WO | 2016/069782 A1 | 5/2016 |
| WO | 2016/122749 A2 | 8/2016 |
| WO | 2017/100135 A1 | 6/2017 |

OTHER PUBLICATIONS

"On the Practicality of Motion Based Keystroke Inference Attack" Bibliography: Trust 2012: Trust and Trustworthy Computing pp. 273-290.*

Non-Final Office Action dated May 19, 2016, for U.S. Appl. No. 14/140,790, of Quigley, O.S.C., filed Dec. 26, 2013.

Notice of Allowance dated Nov. 18, 2016, for U.S. Appl. No. 14/140,790, of Quigley, U.S.C., filed Dec. 26, 2013.

(56) References Cited

OTHER PUBLICATIONS

First Examination Report for Australian Patent Application No. 2016367092, dated Jul. 25, 2018.
Advisory Action dated Sep. 21, 2018, for U.S. Appl. No. 15/474,761, of Wolter, J.A., et al., filed Mar. 30, 2017.
"Technical Brief NVIDIA GeForce 8800 GPU Architecture Overview World's First Unified DirectX 10 GPU Delivering Unparalleled Performance and Image Quality," NVIDIA Corporation, published Nov. 1, 2006, Retrieved from Internet URL: http://web.cse.ohio-state.edu/~agrawal.28/788-su08/Papers/week2/GPU.pdf, on Oct. 6, 2017, pp. 17-20.
Yang, J., and Goodman, J., "Symmetric Key Cryptography on Modern Graphics Hardware," Advances in Cryptology, ASIACRYPT 2007, LNCS vol. 4833, pp. 249-264.
Non-Final Office Action dated Nov. 17, 2015, for U.S. Appl. No. 13/713,985, of Sather, E., et al., filed Dec. 13, 2012.
Non-Final Office Action dated Feb. 1, 2016, for U.S. Appl. No. 14/527,639, of Zovi, D.D., filed Oct. 29, 2014.
Notice of Allowance dated Apr. 27, 2016, for U.S. Appl. No. 14/527,639, of Zovi, D.D., filed Oct. 29, 2014.
Non-Final Office Action dated May 6, 2016, for U.S. Appl. No. 14/527,629, of Zovi, D.D., filed Oct. 29, 2014.
Non-Final Office Action dated May 19, 2016, for U.S. Appl. No. 14/542,481, of Zovi, D.D., filed Nov. 14, 2014.
Final Office Action dated Jun. 14, 2016, for U.S. Appl. No. 13/713,985, of Sather, E., et al., filed Dec. 13, 2012.
Notice of Allowance dated Jul. 11, 2016, for U.S. Appl. No. 14/527,629, of Zovi, D.D., filed Oct. 29, 2014.
Non-Final Office Action dated Aug. 26, 2016, for U.S. Appl. No. 14/964,430, of Zovi, D.D., et al., filed Dec. 9, 2015.
Advisory Action dated Sep. 28, 2016, for U.S. Appl. No. 13/713,985, of Sather, E., et al., filed Dec. 13, 2012.
Final Office Action dated Nov. 18, 2016, for U.S. Appl. No. 14/542,481, of Zovi, D.D., filed Nov. 14, 2014.
Notice of Allowance dated Dec. 6, 2016, for U.S. Appl. No. 14/964,430, of Zovi, D.D., et al., filed Dec. 9, 2015.
Non Final Office Action dated Feb. 10, 2017, for U.S. Appl. No. 15/252,113, of Zovi, D.D., filed Aug. 30, 2016.
Non Final Office Action dated Mar. 31, 2017, for U.S. Appl. No. 15/196,003, of Zovi, D.D., filed Jun. 28, 2016.
Examination Report No. 1 for Australian Patent Application No. 2015339271, dated May 12, 2017.
Final Office Action dated Jul. 28, 2017, for U.S. Appl. No. 15/252,113, of Zovi, D.D., filed Aug. 30, 2016.
Notice of Allowance dated Aug. 30, 2017, for U.S. Appl. No. 15/252,113, of Zovi, D.D., filed Aug. 30, 2016.
Final Office Action dated Sep. 22, 2017, for U.S. Appl. No. 15/196,003, of Zovi, D.D., filed Jun. 28, 2016.
Non-Final Office Action dated Nov. 30, 2017, for U.S. Appl. No. 15/444,931, of Zovi, D.D., et al., filed Feb. 28, 2017.
Non-Final Office Action dated Dec. 20, 2017, for U.S. Appl. No. 15/474,761, of Wolter, J.A., et al., filed Mar. 30, 2017.
Notice of Allowance dated Jan. 4, 2018, for U.S. Appl. No. 15/196,003, of Zovi, D.D., filed Jun. 28, 2016.
Notice of Allowance dated Mar. 30, 2018, for U.S. Appl. No. 15/444,931, of Zovi, D.D., et al., filed Feb. 28, 2017.
Final Office Action dated Jun. 26, 2018, for U.S. Appl. No. 15/474,761, of Wolter, J.A., et al., filed Mar. 30, 2017.
Ex Parte Quayle Action dated Jul. 6, 2018, for U.S. Appl. No. 13/713,985, of Sather, E., et al., filed Dec. 13, 2012.
International Search Report and Written Opinion for International Application No. PCT/US2015/057876, dated Mar. 31, 2016.
International Search Report and Written Opinion for International Application No. PCT/US2015/060713, dated Jul. 26, 2016.
International Search Report and Written Opinion for International Application No. PCT/US2016/065003, dated Feb. 7, 2017.
Extended European Search Report for European Patent Application No. 15854476.7, dated Sep. 29, 2017.

* cited by examiner

PASSCODE ENTRY THROUGH MOTION SENSING

CROSS-REFERENCE TO RELATED APPLICATION

This application is a continuation of, and claims priority to, U.S. patent application Ser. No. 14/140,790, filed Dec. 26, 2013.

BACKGROUND

A financial transaction system, as used herein, is a system that allows a merchant to use, for example, a mobile device, to accept payment for selling a product or a service to a purchaser.

In one example, the financial transaction system includes a mobile device (e.g., an iPad, an iPhone, etc.) and a card reader. The card reader is in the form of an accessory and couples to the mobile electronic device (e.g., the card reader couples to the mobile device through the audio jack of the mobile device). In this example, a purchaser uses a financial transaction card (e.g., a credit card or a debit card) to purchase the seller's product or service by allowing his credit card to be swiped through the card reader. The card reader communicates the card's data to the mobile electronic device, allowing the mobile device to confirm authenticity of the card and further initiate authorization of the purchase transaction. In another example, the financial transaction system may include a mobile electronic device that accepts card-less payments from purchasers. In this example, a purchaser may convey his credit card information to the seller through a direct or indirect form of wireless communication with the seller's mobile device. A person of any skill in this space would easily be aware of countless other mechanisms that allow similar financial transactions to proceed in the context of such "mobile" payments.

While such mobile payment opportunities offer convenience and ease of use to both the seller and the purchaser, there are scenarios that may present new security concerns. For example, as part of the transaction flow, the purchaser may sometimes be required to enter a PIN code as an additional layer of security. Such PIN codes are required, for example, in debit-card based purchases and even in some credit-card (e.g., EMV card) based purchased. In such scenarios, the financial transaction system needs to protect the PIN from being discovered by, for example, malware or other phishing events.

Figure 1A:
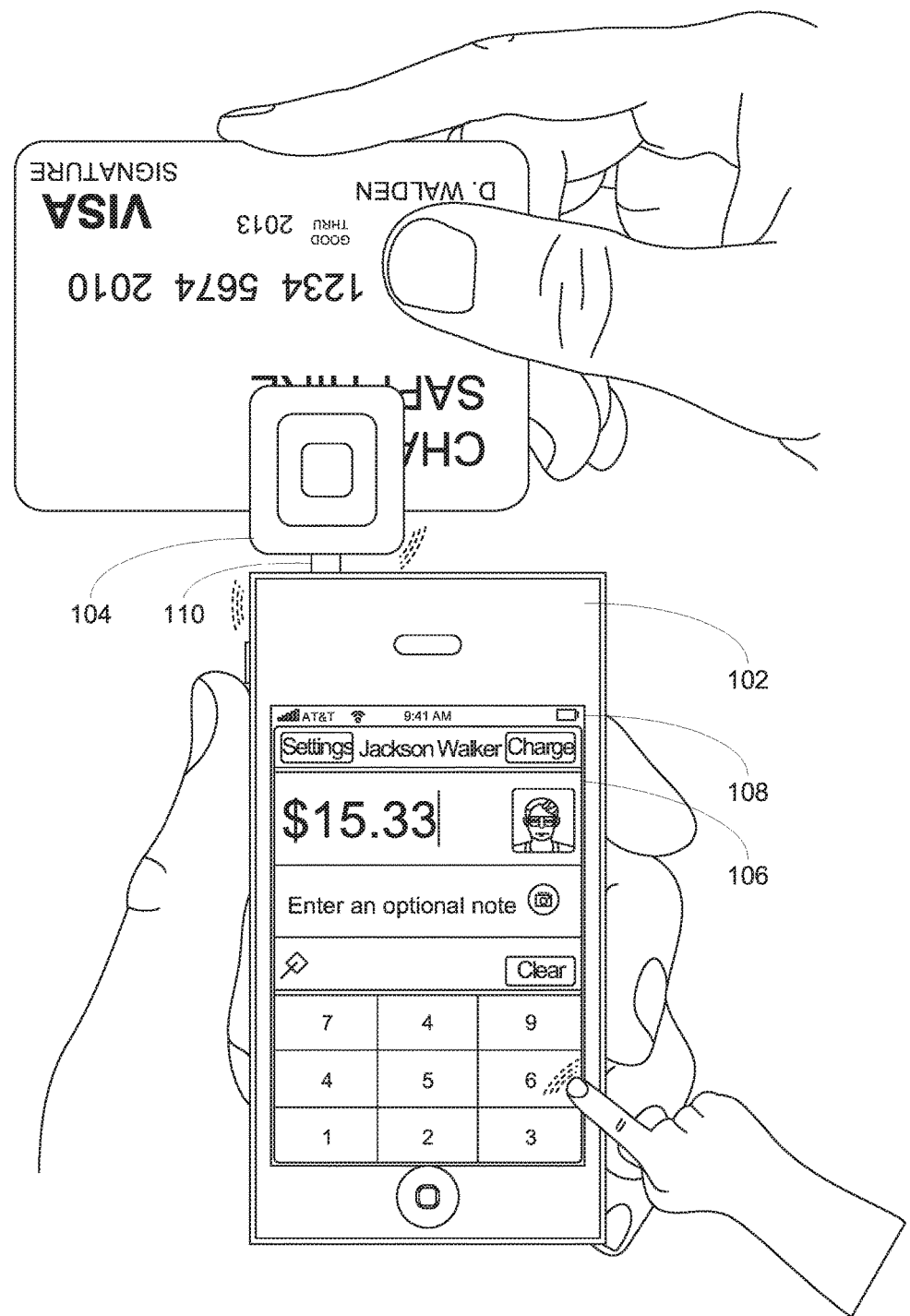
FIG. 1A is diagram illustrating a technique of passcode entry based on motion pattern readings involving an electronic device and a card reader.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The financial transaction system described herein involves a card reader and a general-purpose electronic device, such as a mobile device or a stationary/semi-stationary system. For example, the mobile device may be a mobile phone or a tablet and the stationary/semi-stationary system may be a point of sale system or a desktop computer. The card reader may be an external device (e.g., in the form of a mobile phone accessory) that can be coupled to the general-purpose electronic device. When the card reader detects a financial transaction card (based on, e.g., the card being swiped through the card reader, the card being brought in proximity to enable radio frequency (RF) or Bluetooth Low Energy (BLE) communication between the card and the reader, etc.), the card reader accesses card information stored on the financial transaction card to initiate a financial transaction through the general-purpose electronic device. The financial transaction card is a card storing financial account related data to be used in a financial transaction, such as to make a purchase. For example, the financial transaction card may be a credit card, a debit card, or an integrated circuit card in accordance with the Europay, MasterCard, or Visa (EMV) standard.

In some instances, a user (i.e., a purchaser) initiating the financial transaction may need to enter a passcode, such as a personal identification number (PIN) or a password, on a passcode entry interface to authenticate the financial transaction. The passcode entry interface may solicit the user to identify a sequence of symbols/digits representing the passcode. Such a passcode entry interface may be implemented on either the electronic device or the card reader, such as having the symbols/digits displayed on or printed on the electronic device or the card reader. For the purpose of the techniques discussed herein, it is understood that the passcode entry interface may not even require active components for soliciting The disclosed technique involves using, for example, motion sensors to determine the passcode instead of recording the passcode entered by a user using a conventional input component (e.g., a touchscreen, buttons, or a keyboard) of the electronic device. The motion sensors may be contained in the electronic device or in the card reader or may also be distributed between the two devices. The card reader or the electronic device uses readings from the motion sensors to determine the passcode entered by the user—instead of inferring conventional key inputs as the basis for determining the PIN entry, the techniques described here allow for inferring locations on the mobile device the user made selections on and using the locations as the basis for determining the PIN entry.

A primary advantage of such a system is that the user's PIN is not actually perceived by or otherwise recorded by the electronic device. All the electronic device is exposed to is a couple of "touch" actions that cause the electronic device or the card reader (or both) to have corresponding spatial movements. These touch actions may then be used by the card reader or the electronic device to infer the PIN value without exposing the PIN value directly to the electronic device. In one example, the motion sensor readings may directly be transferred over to a secure server allowing the secure server to process the PIN value and simply convey an authentication of the PIN entry to the electronic device or the card reader, thus further removing the actual PIN values from the reach of malware or other phishing elements in the mobile device. Even though a set of numbers may be displayed on the electronic device to allow a purchaser to "key in" the PIN code, touch or other keying-in actions of these numbers do not result in the actual numbers being revealed to the mobile device. An incidental benefit here is that the electronic device or the card reader does not actually have to have a keyboard or a display to actually "display" the numbers. A user could simply touch on, for example, on a plastic or wooden surface (e.g., the back surface of a mobile phone) to enter in the PIN value by simply tapping on designated areas on the surface, thus obviating the need for even using the conventional screen or key input for obtaining the PIN values.

Elaborating further on the techniques, the motion sensors may be located in the electronic device or in the card reader, or, as discussed above, be distributed between both the card reader and the electronic device. In various embodiments, the electronic device or the card reader can determine the passcode by first determining locations/areas of tactile contact by the user based at least in part on the motion sensor readings. The determined locations/areas can correspond with tactile interactions with the passcode entry interface. Subsequently, the electronic device or the card reader can determine the passcode entered by the user by mapping the determined locations/areas to a geometric layout of the passcode entry interface. The geometric layout may include locations of interactive elements of the passcode entry interface corresponding to digits/symbols used to compose the passcode. The electronic device or the card reader can thus determine the passcode entered by the user by mapping the determined locations to a sequence of digits/symbols.

In embodiments, the motion sensors measure the motion pattern of the electronic device and/or the card reader to determine which part of the electronic device or the card reader is subject to a touch event. The electronic device or the card reader uses, for example, a pattern recognition process to determine the locations of the touch event based on a motion model, such as a mapping function or a machine learning model. As defined here, a motion sensor may be any type of sensor that is capable of detecting such movement or registering the requisite motions that would allow for determining what the passcode is. In the way of illustration here, the motion sensor may, for example, be a gyroscope, an accelerometer, a mechanical motion sensor, a compass, a directionality sensor, a vertical motion sensor, or just about any sensor for detecting movement.

In the embodiments where the motion sensors are located in the card reader and touch events occur on the general-purpose electronic device, a rigid connector between the card reader and the general-purpose electronic device may be used for electronic communication and for mechanically coupling movements between the electronic device and the card reader induced by the tactile contacts (e.g., touch events) from the user. Accordingly, the card reader can locate the individual tactile entries representing the passcode via the motion sensors of the card reader.

Accordingly, the disclosed technique provides an alternative method of capturing the passcode entered on the passcode entry interface and an alternative channel (i.e., through mechanical movement) to deliver the passcode to the system (e.g., the card reader) for verifying the passcode. As illustrated above, the alternative method and channel results in substantial alleviation of the security risk associated with passcode entry through a conventional input component (e.g., a keyboard or a touchscreen). In this manner, the passcode entered by the user is not stored electronically until the passcode verification system determines the passcode based at least in part on the motion pattern detected by the motion sensors. The following sections now present illustrative descriptions of this alternative passcode entry system in the context of FIGS. 1 through 6.

FIG. 1A is a diagram illustrating a technique of passcode entry based on motion pattern readings involving an electronic device 102 and a card reader 104. The electronic device 102 may be a general-purpose device. The electronic device 102 may be a mobile device, such as a mobile phone, an e-reader, or a tablet computer. The electronic device 102 may include and execute a general-purpose operating system capable of running one or more third-party applications, which may be downloaded, installed, and executed on the electronic device 102.

For example, the electronic device 102 may include a user interface application 106, such as a sales interface to facilitate consumer/merchant transactions. A display device 108 of the electronic device 102 can display the user interface application 106. The user interface application 106 at a certain point in time during its execution may generate and display a passcode interface on the display device 108. Alternatively, the card reader 104 can display the passcode interface. In some embodiments, the display device 108 may be a touchscreen. In other embodiments, the display device 108 is a display without tactile contact detection capabilities. In other alternative embodiments, the passcode interface may be a printed pattern on the electronic device 102 or the card reader 104, instead of being displayed by a display component.

The passcode interface allows a user of the electronic device 102 to authenticate an operation by the user, such as an operation to process a financial transaction. For example, the card reader 104 can detect a swipe of a financial transaction card. Upon detecting the swipe, the card reader 104 can initiate a financial transaction process on the electronic device 102, e.g., via the user interface application 106. The financial transaction process may require an authentication from the user, such as by entering a passcode. The passcode may take the form of a pattern, a numeric sequence, an alphabetical sequence, an alpha-numeric sequence, an answer to a particular question, or other forms of data that can be composed and replicated via buttons or other interactive elements of the passcode interface.

As the user enters the passcode by pressing, making contact, or performing gestures on the display device 108 of the electronic device 102, movements of the electronic device 102 can uniquely identify where and how the user has contacted the electronic device 102. A connection bridge 110 can carry the mechanical movements between the card reader 104 and the electronic device 102. The connection bridge 110 may include a rigid material that can translate the movements from the electronic device 102 to the card reader 104. The connection bridge 110 may also include one or more conducting wires to electrically connect the card reader 104 and the electronic device 102.

Figure 1B:
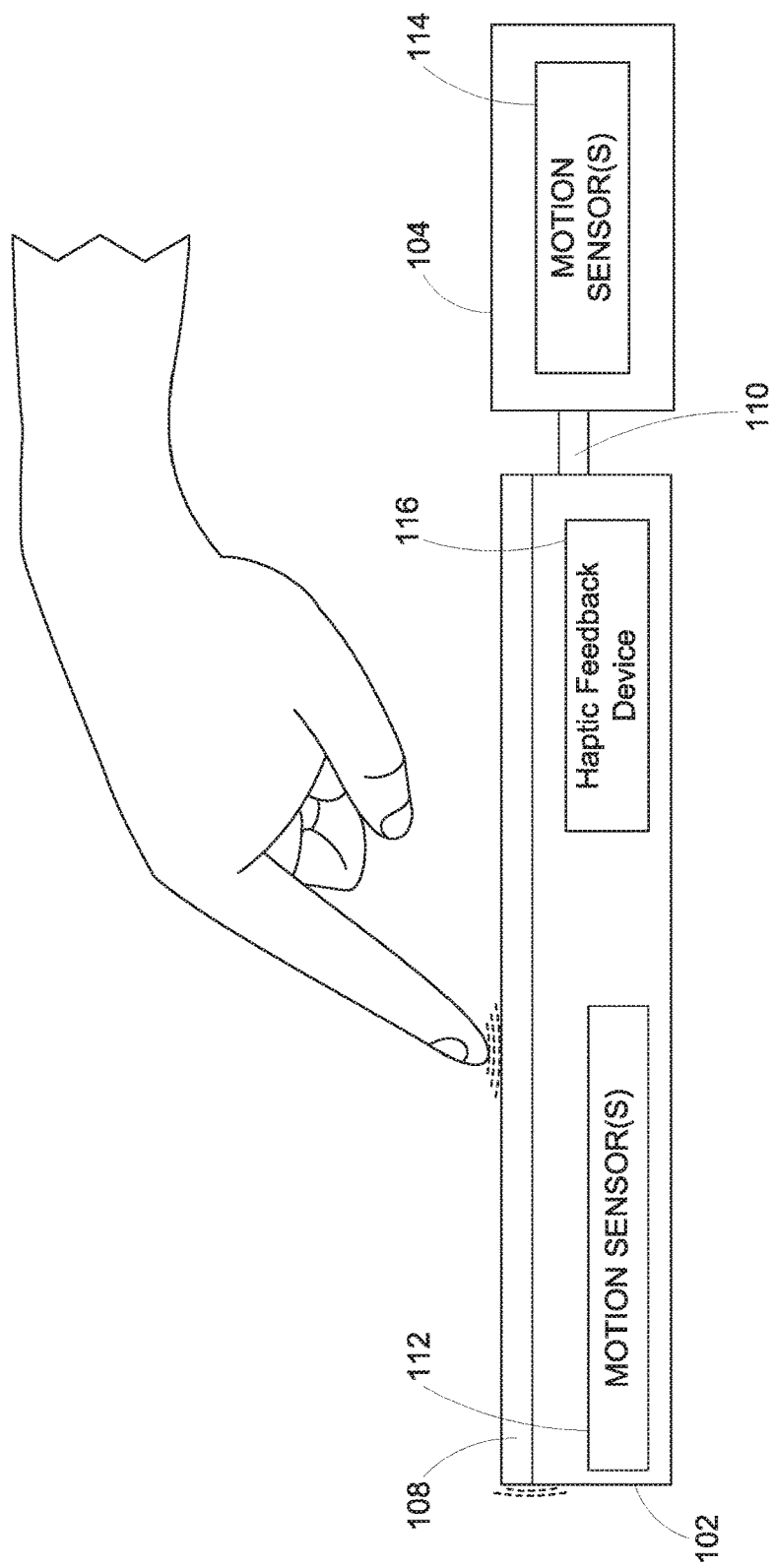
FIG. 1B is a diagram illustrating a side view of the electronic device and the card reader of FIG. 1A.

FIG. 1B is a diagram illustrating a side view of the electronic device 102 and the card reader 104 of FIG. 1A. In some embodiments, the electronic device 102 includes motion sensors 112 capable of detecting the movements that uniquely identify where and how the user contacts the electronic device 102 or the card reader 104. The motion sensors 112 are sensors that are capable of detecting movement. In these embodiments, the electronic device 102 can determine locations of tactile entries (e.g., touch events) from motion data of the motion sensors 112. The electronic device 102 can then determine the passcode entered by the user by mapping the locations of the tactile entries to symbols used to compose a passcode. The mapping may depend on where the symbols are displayed or printed on the electronic device 102 or the card reader 104. The sequence of the symbols corresponding to the locations is indicative of the passcode entered by the user through the touch events. For example, the symbols may be individual alphabets, individual numbers, or graphical icons that are displayed or printed on the electronic device 102 or the card reader 104. The electronic device 102 can use the locations of where the symbols are to determine the passcode from the locations of tactile entries.

In other embodiments, the card reader 104 includes motion sensors 114 capable of detecting the movements that uniquely identify where and how the user contacts the electronic device 102. The movements of the electronic device 102 can be mechanically carried over to the card reader 104. The card reader 104 can determine the locations of tactile entries (e.g., touch events) from motion data of the motion sensors 114. Similar to the embodiments described above, the card reader 104 can determine the passcode by mapping the locations of tactile entries to symbols used to compose a passcode. The mapping may depend on where the symbols are displayed or printed on the electronic device 102 or the card reader 104. The sequence of the symbols corresponding to the locations is indicative of the passcode entered by the user through the touch events. The electronic device 102 may transmit the locations of where the symbols are displayed or printed to the card reader 104 to facilitate the mapping of the tactile entries to the symbols.

In various embodiments, determining the locations of the tactile entries from the motion data may be based at least in part on a mapping function or a machine learning model. Prior to running the motion data through the mapping function or the machine learning model, the motion data may be normalized, preprocessed, combined, divided, or transformed into data features. A data feature is an individual measurable heuristic property of a phenomena being observed. Features can be numeric or structural, such as numbers, strings, trees, or graphs.

Part of the normalization process of the motion data may include subtracting out expected movements or range of movements. For example, the electronic device 102 or the card reader 104 can deploy a minimum and/or a maximum threshold of movement range to filter out movements that are known to be unrelated to tactile entries by the user. As an example, the normalization process can subtract out movement caused by components (e.g., a haptic feedback device 116) of the electronic device 102. As another example, the normalization process can use movements outside of a time window of entering the passcode to determine a nominal baseline movement level. The normalization process can then use the nominal baseline movement level to normalize the motion data within the time window to determine the locations of the tactile entries.

The machine learning model may be updated and trained across different devices, or trained specifically for the electronic device 102. The machine learning model can be trained for a specific user, or across different users. The machine learning model may by updated periodically or when the tactile entries are determined to occur on the passcode entry interface. For example, the electronic device 102 or the card reader 104 can update the machine learning model by comparing the determined locations of tactile entries against touchscreen data of the display device 108. The electronic device 102 or the card reader 104 may store a default machine learning model acting as a starting point before updating the model. The default machine learning model may be part of the factory setting of the electronic device 102 or the card reader 104. The electronic device 102 can download and install the default machine learning model from an external server. The machine learning model may be based on a Gaussian Mixture Model, a Hidden Markov Model, or a Support Vector Machine Model.

Figure 2:
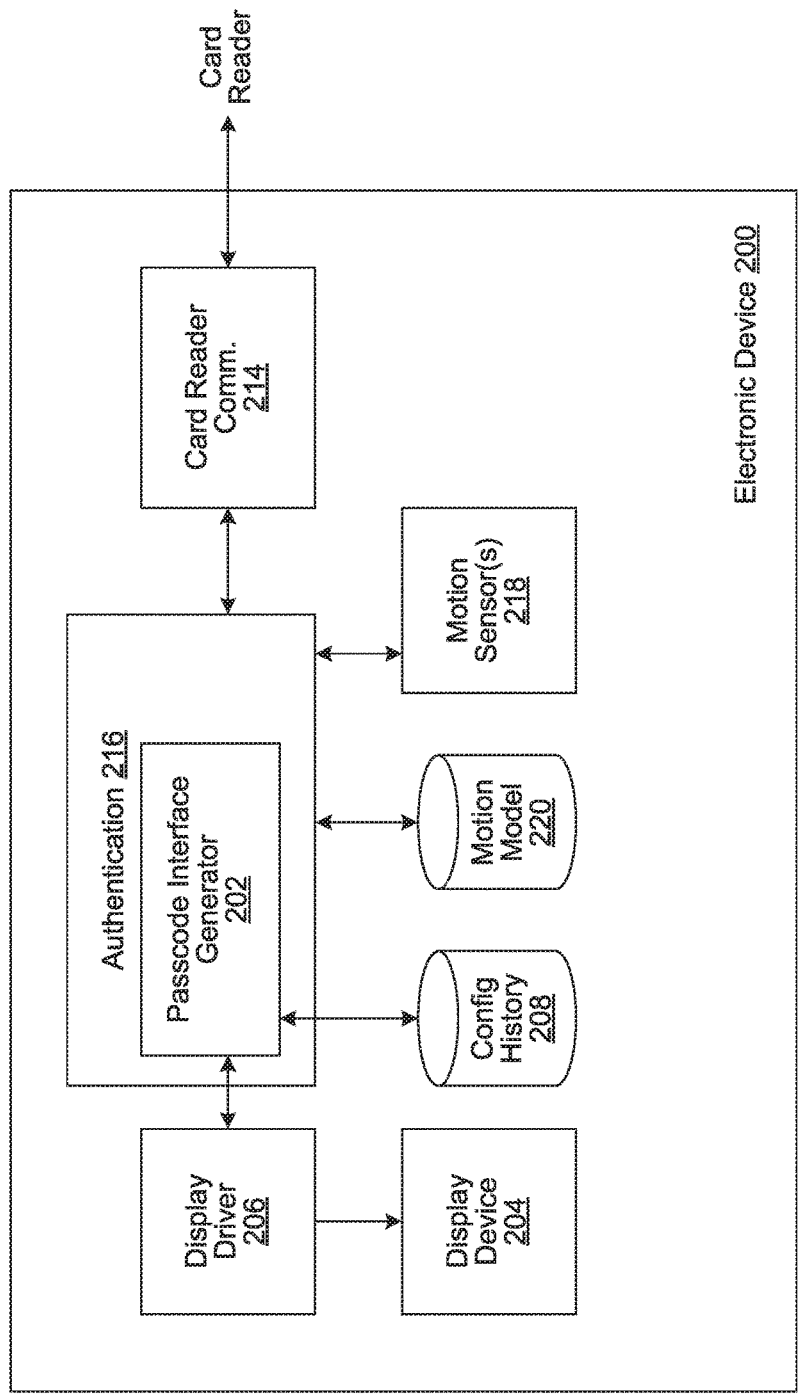
FIG. 2 is a block diagram illustrating an electronic device, consistent with various embodiments.

FIG. 2 is a block diagram illustrating an electronic device 200, consistent with various embodiments. The electronic device 200 may be the electronic device 102 of FIG. 1. The electronic device 200 can include a passcode interface generator module 202. The passcode interface generator module 202 is configured to generate a passcode interface on a display device 204, such as the display device 108 of FIG. 1. The passcode interface generator module 202 communicate and configure what to display on the display device 204 via a display driver 206. The passcode interface generator module 202 may further be configured to modify the passcode interface between user sessions, transaction instances, or tactile interactions (e.g., touch events) by the user. The passcode interface generator module 202 can record different arrangements and geometric configurations of instances of the passcode interface in a configuration history store 208.

The electronic device 200 can generate the passcode interface, in response to an external card reader detecting a swipe of a financial transaction card. The electronic device 200 can display the passcode interface to solicit a passcode entry for authenticating a financial transaction initiated by the card swipe. The electronic device 200 can communicate with the external card reader via a card reader communication module 214. An authentication module 216 can manage the process of authenticating the financial transaction. In various embodiments, the passcode interface generator module 202 may be part of the authentication module 216. Both the authentication module 216 and the passcode interface generator module 202 may be part of the user interface application 106 of FIG. 1.

In some embodiments, the authentication module 216 can determine locations or areas of where touch events by the user are occurring or have occurred. These touch events can represent user interactions with the passcode interface. In these embodiments, the electronic device 200 includes one or more motion sensors 218, such as the motion sensors 112 of FIG. 1. The authentication module 216 can collect motion data from the motion sensors 218, such as during a time window when the passcode interface is displayed. The motion data can be processed into data features. The data features can be processed through a mapping function or a machine learning model. The mapping function or the machine learning model can be stored in a motion model store 220. The authentication module 216 can run the data features through the mapping function or the machine learning model to determine the locations or areas of the touch events.

The authentication module 216 can determine the passcode entered by the user based at least in part on the determined locations/areas of the touch events. For example, the authentication module 216 can map the locations/areas of the touch events to digits or symbols represented by areas on the passcode interface. The authentication module 216 can determine the passcode as the sequence of digits or symbols corresponding to the locations/areas of a sequence of touch events. The areas corresponding to the digits or symbols can be stored in the one or more geometric configurations(s) stored in the configuration history store 208.

The authentication module 216 then verifies whether the passcode entry (i.e., passcode entered by the user) matches an authentic passcode by either verifying through the external card reader or through an external server (e.g., a financial service computer server). In some embodiments, the electronic device 200 disables recording of the touch locations as reported by a touchscreen display, while the user is entering the passcode. In some embodiments, no memory device in the electronic device 200 has an unencrypted record of the passcode entry by the user.

In other embodiments, the external card reader determines the locations/areas of the touch events instead of the electronic device 200. In some of these embodiments, no memory device in the electronic device 200 has a record of the touch event locations. The electronic device 200 can send the geometric configuration of the passcode interface to the external card reader through the card reader communication module 214. The geometric configuration is for mapping locations or areas of the touch events (as determined by the external card reader) to interactive elements of the passcode interface. The mapping to the interactive elements enables the external card reader to determine a sequence of symbols representing the passcode entered by the user.

In yet other embodiments, the external card reader can perform the determination of the passcode using motion data from the motion sensors 218 of the electronic device 200, instead of the motion sensors in the external card reader. In these embodiments, the electronic device 200 can send the motion data from the motion sensors 218 through the card reader communication module 214 to the external card reader. The card reader communication module 214 can also send a time window of when the passcode interface is being displayed on the electronic device 200 to the external card reader to facilitate the determination of the passcode.

Figure 3:
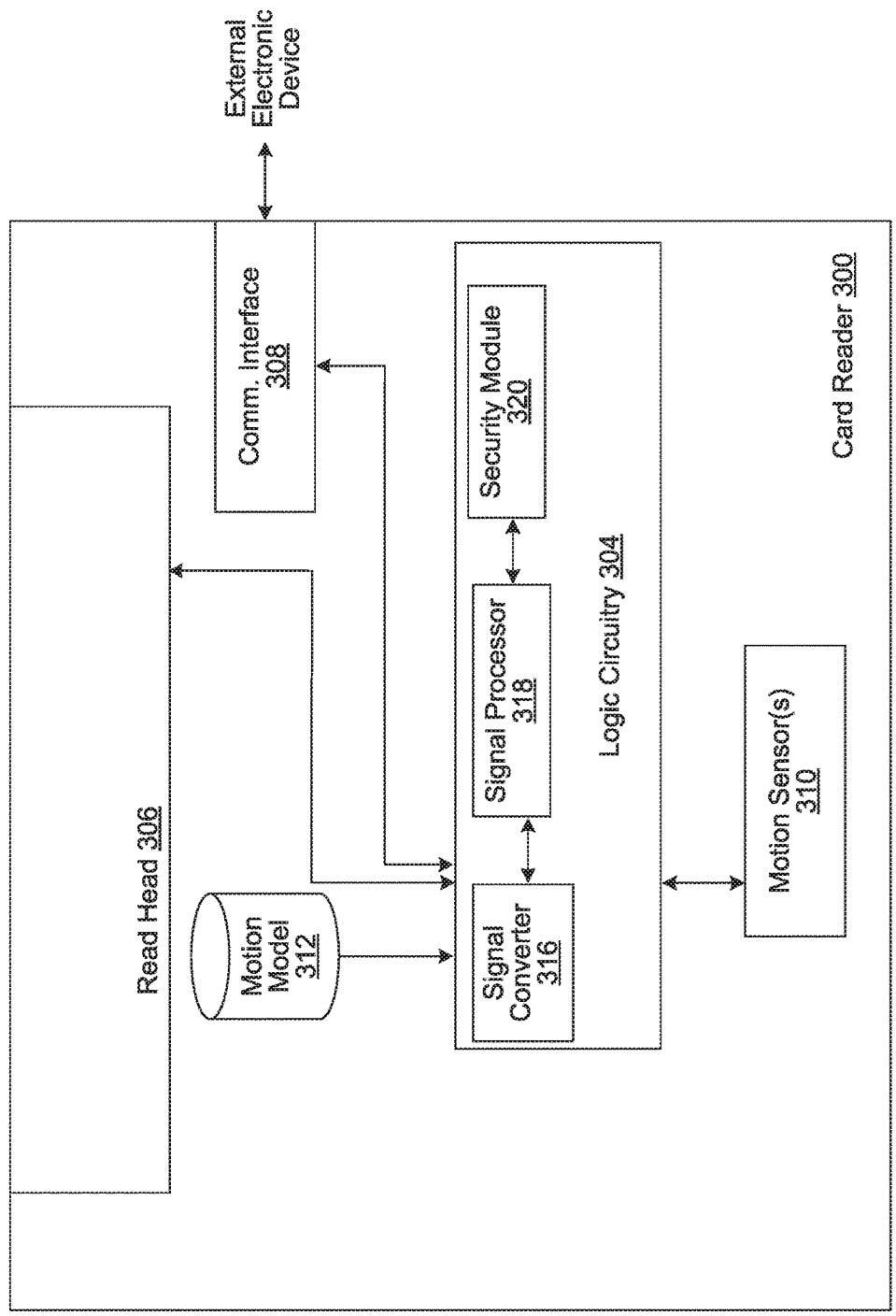
FIG. 3 is a block diagram illustrating a card reader, consistent with various embodiments.

FIG. 3 is a block diagram illustrating a card reader 300, consistent with various embodiments. The card reader 300 includes a logic circuitry 304. The logic circuitry 304 controls and executes processes operated by the card reader 300. The logic circuitry 304 may comprise one or more of an application-specific integrated circuit (ASIC), field programmable gate array (FPGA), a controller, a microprocessor, and other types of digital and/or analog circuitry.

The logic circuitry 304 can communicate with a read head 306. The read head 306 can detect presence of a financial transaction card, such as when the read head 306 detects a swipe of a card. The read head 306 may be a magnetic strip reader, a radiofrequency identification (RFID) reader, a radio frequency receiver, an optical reader, or any combination thereof.

The logic circuitry 304 can communicate with an electronic device, such as the electronic device 200 of FIG. 2, via a communication interface 308. The logic circuitry 304 can initiate a financial transaction with the electronic device through the communication interface 308 when the read head 306 detects the presence of the financial transaction card. The logic circuitry 304 can send a message to the electronic device through the communication interface 308 to initiate the financial transaction. In some embodiments, the message can cause the electronic device to generate and display a passcode interface. While the financial transaction is pending, the logic circuitry 304 can monitor motion data reported by motion sensors 310, such as the motion sensors 114 of FIG. 1. Optionally, the communication interface 308 can receive a message indicating a time window of when the passcode interface is displayed. The logic circuitry 304 can use the time window to normalize or pre-process the motion data.

To determine touch events based on the motion data from the motion sensors 310, the logic circuitry 304 can access one or more tactile entry models in a motion model store 312. The tactile entry models may be one or more mapping functions and/or one or more machine learning models. The logic circuitry can process the motion data into data features. The processing of the motion data may include data normalization, range filtering, joining, splitting, transforming, or any combination thereof. The logic circuitry 304 processes the data features through the tactile entry models to determine locations or areas of the touch events. The logic circuitry 304 can further use the geometric configurations of the interactive elements on the passcode interface to determine the passcode entered by the user. The communication interface 308 may receive a message indicating the geometric configurations of the passcode interface during the indicated time window of when the passcode interface is displayed. For example, the logic circuitry 304 can map the touch events to symbols represented by the interactive elements. The logic circuitry 304 can then determine the passcode entered as the sequence of the symbols corresponding to a sequence of the touch events.

In some embodiments, the logic circuitry 304 can transmit the determined passcode entry (i.e., the passcode entered by the user) through the communication interface 308 to either the electronic device or an external financial system to verify the passcode entry's authenticity. In other embodiments, the logic circuitry 304 compares the passcode entry with an authentic passcode accessible in the financial transaction card through the read head 306. In yet other embodiments, the logic circuitry 304 can verify the passcode entry's authenticity through the read head 306 without actually retrieving the authentic passcode (e.g., by comparing a hash function of both the determined passcode entry and the authentic passcode).

In various embodiments, the logic circuitry 304 may include a signal converter 316, a signal processor 318, and a security module 320. The signal converter 316 is circuitry that converts analog readings from the read head 306 into digital inputs. The signal processor 318 is circuitry for processing and interpreting the digital inputs from the signal converter 316 into card information, representative of financial account information of a user. Optionally, the logic circuitry 304 may include the security module 320 to encrypt and/or decrypt information to and from the financial transaction card.

Regarding FIGS. 2-3, blocks, components, and/or modules associated with the electronic device 200 or the card reader 300 each may be implemented in the form of special-purpose circuitry, or in the form of one or more appropriately programmed programmable processors, or a combination thereof. For example, the modules described can be implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via a communication module to coordinate its operations via an interconnect or wirelessly. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The electronic device 200 or the card reader 300 may include additional, fewer, or different modules for various applications.

Figure 4:
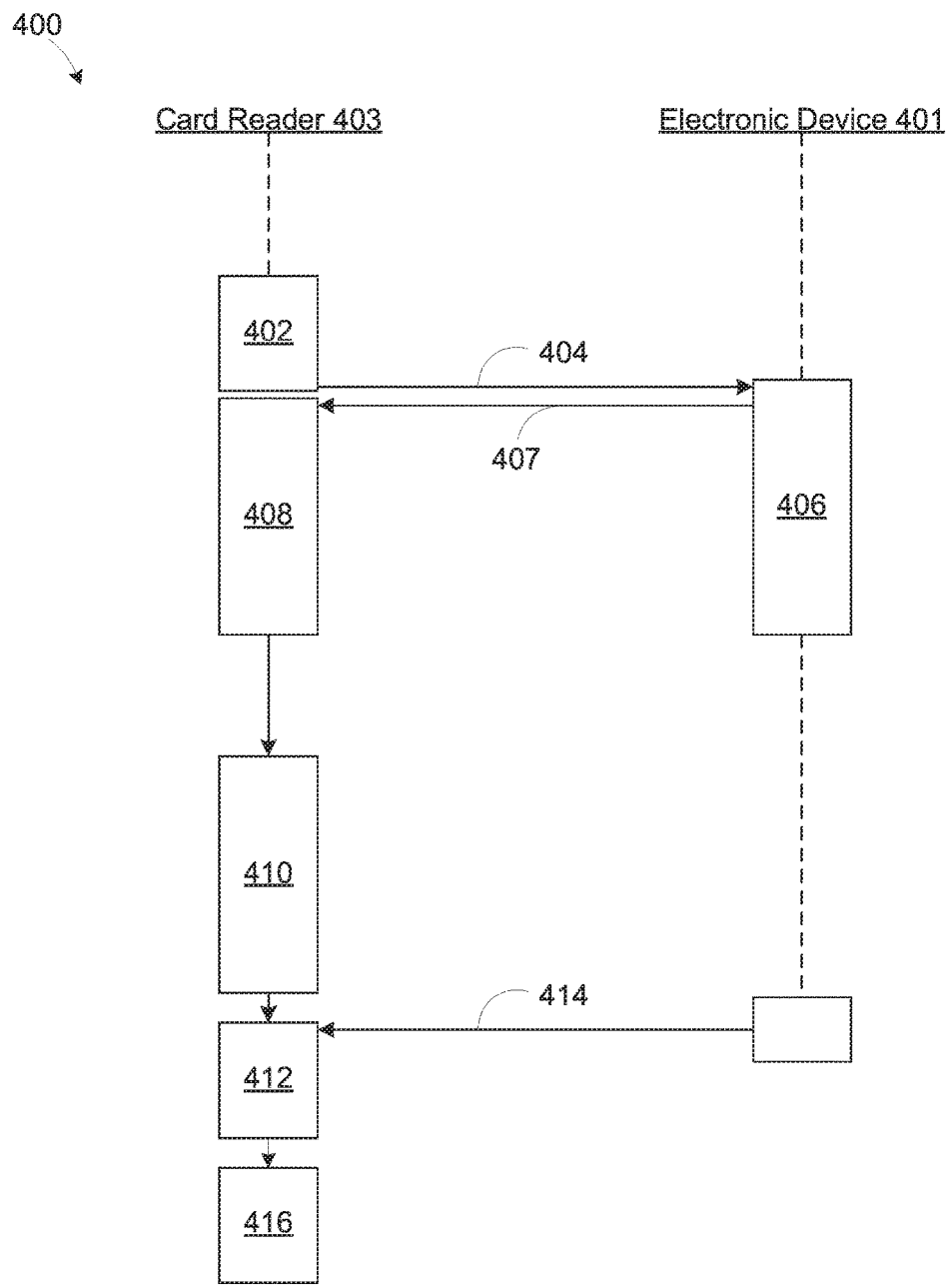
FIG. 4 is a sequence diagram of a process to operate an electronic device and a card reader to authenticate a financial transaction.

FIG. 4 is a sequence diagram of a process 400 to operate an electronic device 401 and a card reader 403 (e.g., the card reader 104 of FIG. 1 or the card reader 300 of FIG. 3) to authenticate a financial transaction. The process 400 includes step 402, where the card reader 403 initializes a financial transaction in response to detecting presence of a financial transaction card. Detection of the card's presence may include detecting a swipe of the financial transaction card at a read head of the card reader 403. The card reader 403 is attached to the electronic device 401, such as a mobile phone, a tablet, or a point of sale terminal, through a connection bridge, such as the connection bridge 110 of FIG. 1. The connection bridge may electrically couple the card reader 403 and the electronic device 401. The connection bridge may include a rigid portion to mechanically couple the card reader 403 and the electronic device 401 such that miniscule movements caused by user touch events may be carried over from the electronic device 401 to the card reader 403 and vice versa.

In response to initializing the financial transaction, the card reader 403 sends and the electronic device 401 receives, in step 404, card data associated with the financial transaction card. In response to receiving the card data, the electronic device 401 displays a passcode entry interface for authenticating the financial transaction in step 406. The passcode entry interface may be displayed on a display device, such as the display device 108 of FIG. 1 or the display device 204 of FIG. 2. The display device may be located in the electronic device 401 or the card reader 403. Alternatively, the passcode entry interface may be printed onto the electronic device 401 or the card reader 403. Step 406 may include sub-step 407, where the electronic device 401 notifies the card reader 403 regarding a duration of when the passcode entry interface is displayed on the electronic device 401. The electronic device 401 can anticipate the duration before the passcode entry interface is displayed. Alternatively, the electronic device 401 can notify the card reader 403 of the actual duration after the financial transaction is initiated.

In step 408, the card reader 403 can record a sequence of motion data for the duration of when the passcode entry interface is displayed. In some embodiments, the motion data may be captured via motion sensors (e.g., the motion sensors 114 of FIG. 1) in the card reader 403. In other embodiments, the motion data may be captured via motion sensors (e.g., the motion sensors 112 of FIG. 1) in the electronic device 401. In these embodiments, the electronic device 401 may send the motion data to the card reader 403 after the motion data is captured. The sequence of motion data may be a sequence of accelerometer readings or gyroscopes readings.

The card reader 403 can determine locations or areas of tactile presses (e.g., touch events) on the passcode entry interface from the sequence of motion data in step 410. Alternatively, the electronic device 401 or the card reader 403 can also recognize the sequence of motion data as tactile gestures or other patterns of contact. The distinct tactile presses, the tactile gestures, or the other touch patterns may be recognized as either absolute or relative sequences of locations. In some embodiments, the electronic device 401, instead of the card reader 403, can determine the locations or areas of the touch events from the sequence of motion data.

In various embodiments, only the motion pattern readings within a time window are used to determine the locations/areas of the touch events. The time window may be a period of time when the electronic device expects the user to enter the passcode entry. The card reader 403 can receive the time window from the electronic device 401. For example, the time window may be a time period of when the passcode entry interface is displayed on the electronic device 401. The card reader 403 may normalize motion pattern readings within the time window with motion pattern readings outside of the time window.

After the locations or areas of the touch events are determined, either the electronic device 401 or the card reader 403 may determine a passcode entry from the locations or areas based at least in part on a geometric map of interactive elements displayed on the passcode entry interface in step 412. For example, the electronic device 401 or the card reader 403 can map the locations or areas to a sequence of symbols shown on the passcode entry interface to solicit user interaction. The geometric map may include the locations of these symbols. The sequence of the symbols corresponding to the touch events can represent the passcode entered. When the card reader 403 is used to determine the passcode entry, step 412 may also include sub-step 414, where the card reader 403 receives the geometric map from the electronic device 401. Sub-step 414 may occur prior to or after step 412 begins. Sub-step 414 may occur before, concurrently, or after step 406.

Alternatively, the card reader 403 may determine the geometric map of the passcode entry interface by following a known sequence or algorithm. In various embodiments, the geometric map of the passcode entry interface can change between user sessions, financial transactions, or individual tactile contacts. The electronic device 401 can send a history of instances of the geometric map to the card reader 403.

After the passcode entry is determined, either the card reader 403 or the electronic device 401 may authenticate the financial transaction by verifying the passcode entry in step 416. For example, the card reader 403 can verify passcode entry with the financial transaction card via the read head of the card reader 403. As another example, the passcode entry may be verified on a remote server controlled by a financial entity.

Figure 5:
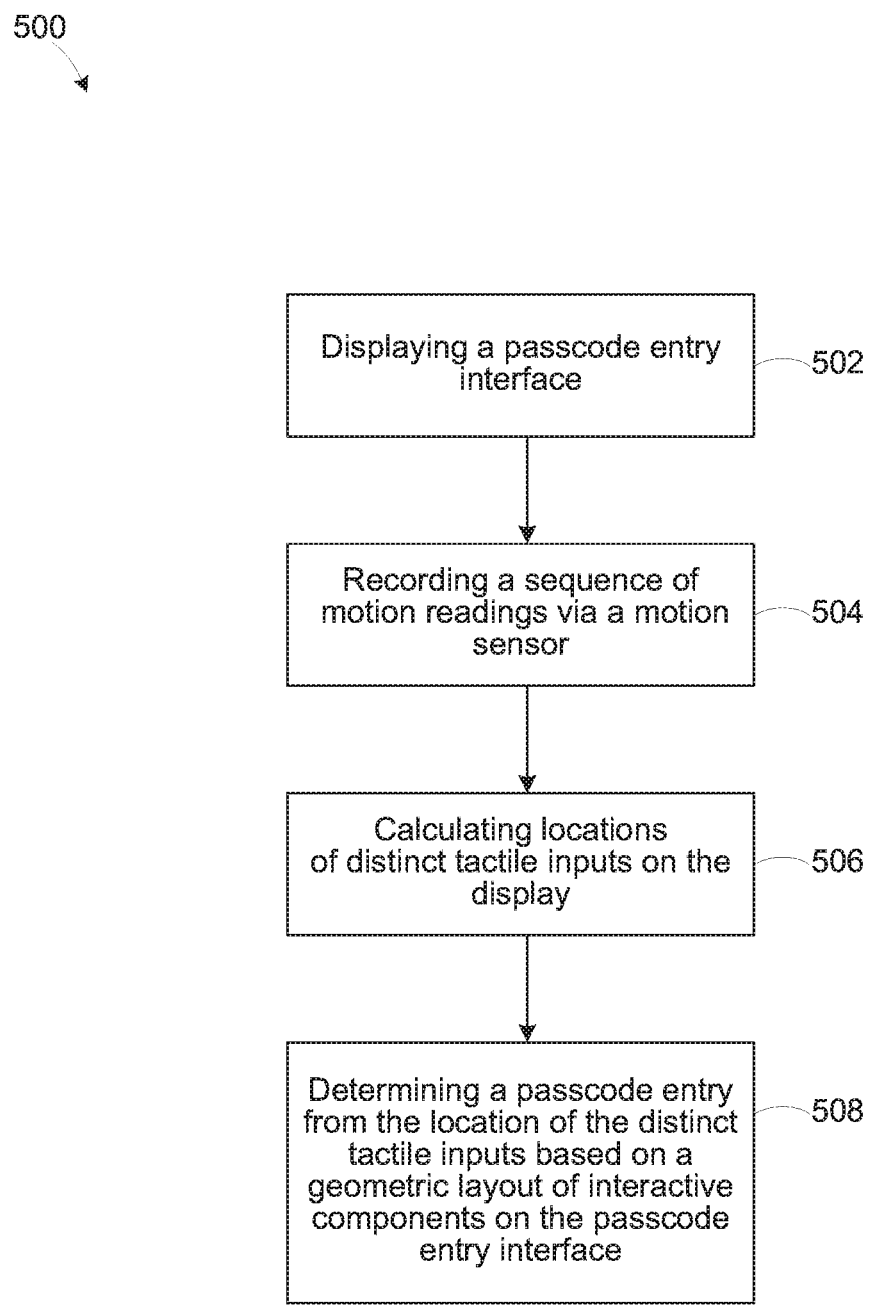
FIG. 5 is a flow chart of a process of detecting passcode entry through motion pattern readings from at least a motion sensor mechanically coupled to a display.

FIG. 5 is a flow chart of a process 500 of detecting passcode entry through motion pattern readings from at least a motion sensor mechanically coupled to a display. The process 500 includes displaying a passcode entry interface on the display in step 502. Then, a first device mechanically coupled to the display can record a sequence of motion readings via a motion sensor in step 504. For example, the first device may be the electronic device 200 of FIG. 2 or the card reader 300 of FIG. 3. The display may be part of the first device. The display may also be part of a second device that is mechanically coupled to the first device such that movements made by user touch events on the second device may be measured on the first device. The second device may be in data communication with the first device.

The first device or the second device can calculate locations of tactile entries (e.g., contact with the display) on the display in step 506. The tactile entries may be tactile presses or tactile gestures on the display. The first device or the second device can calculate the locations based at least partly on the sequence of motion readings. For example, the locations can be calculated based on: the sequence of motion readings, a known weight of the first or second device, geometric measurements of the display, geometric measurements of the passcode entry interface, or any combination thereof. Calculating the locations may include normalizing the motion data, processing the motion data to generate data features, and running the data features through a machine learning model capable of determining regions of tactile contacts based on the data features.

After the locations of the tactile entries are determined, the first device or the second device can determine a passcode entry (i.e., the passcode entered by the user) from the locations or regions of the tactile entries based at least partly on a geometric map/layout of interactive components on the passcode entry interface in step 508. In some embodiments, the geometric layout of the interactive components can evolve during a duration of displaying the passcode entry interface. In these embodiments, the passcode entry can be calculated based at least partially by mapping the tactile entries spatially (i.e., matching in location) and temporally (i.e., matching in time) to one or more instances of the geometric map of the passcode entry interface.

While processes or blocks are presented in a given order in FIGS. 4 and 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Figure 6:
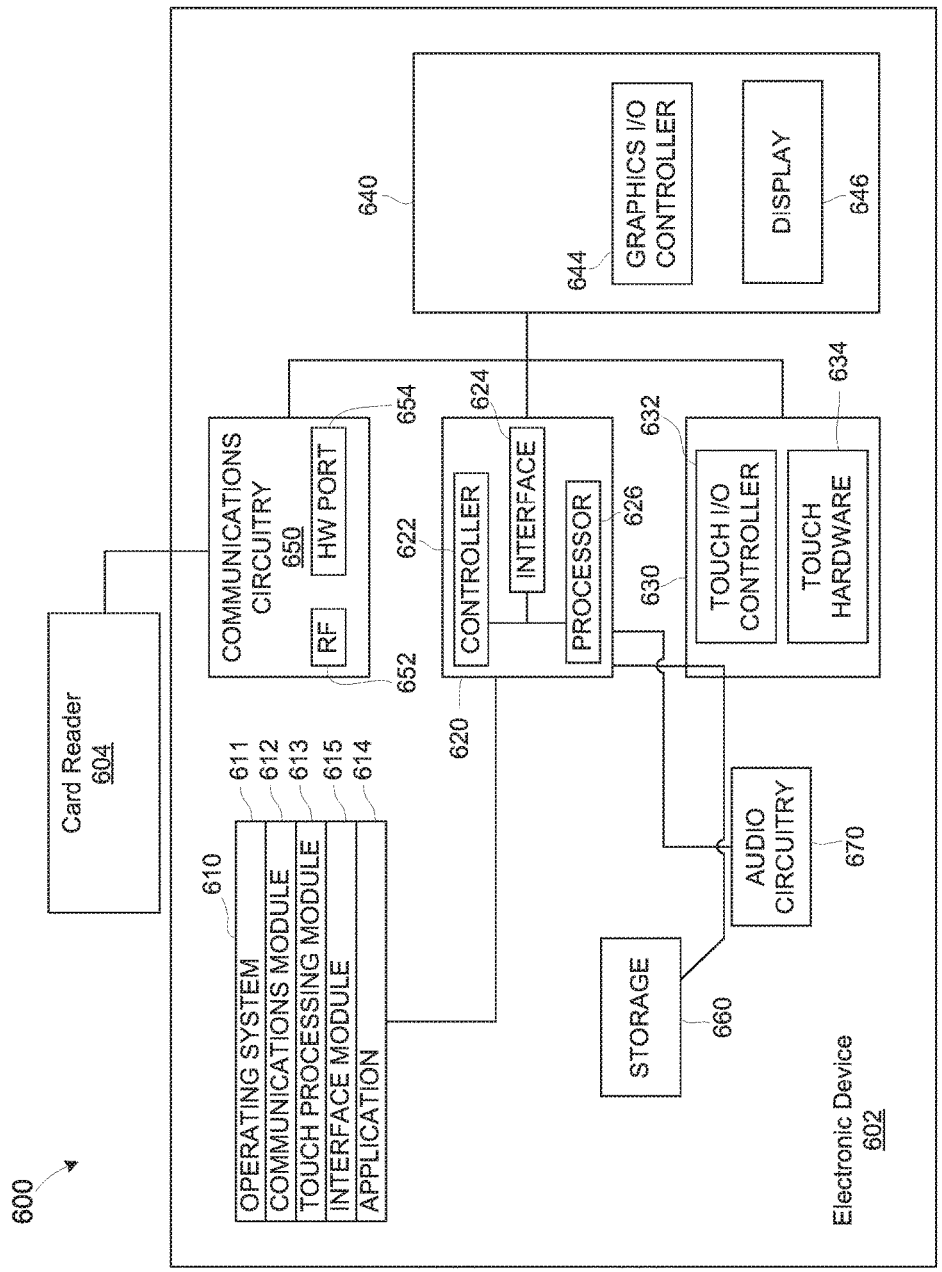
FIG. 6 is a block diagram of a passcode entry system including an electronic device and a card reader.

FIG. 6 is a block diagram of a passcode entry system 600 including an electronic device 602 (e.g., the electronic device 200 of FIG. 2) and a card reader 604 (e.g., the card reader 300 of FIG. 3). Note that the architecture shown in FIG. 6 is only one example architecture of the passcode entry system 600, and that the electronic device 602 could have more or fewer components than shown, or a different configuration of components. The various components shown in FIG. 6 can be implemented by using hardware, software, firmware or a combination thereof, including one or more signal processing and/or application specific integrated circuits.

The electronic device 602 that can include one or more computer-readable mediums 610, processing system 620, touch subsystem 630, display/graphics subsystem 640, communications circuitry 650, storage 660, and audio circuitry 670. These components may be coupled by one or more communication buses or other signal lines. The electronic device 602 can be the same as or similar to the electronic device 102, the electronic device 200, or the electronic device 401 of FIG. 4.

The communications circuitry 650 can include RF circuitry 652 and/or port 654 for sending and receiving information. The RF circuitry 652 permits transmission of information over a wireless link or network to one or more other devices and includes well-known circuitry for performing this function. The port 654 permits transmission of information over a wired link. The communications circuitry 650 can communicate, for example, with the card reader 604. Alternatively, the card reader 604 may be connected through the audio circuitry 670. The communications circuitry 650 can be coupled to the processing system 620 via a peripherals interface 624. The peripherals interface 624 can include various known components for establishing and maintaining communication between peripherals and the processing system 620.

The audio circuitry 670 can be coupled to an audio speaker (not shown), a microphone (not shown), the card reader 604, or any combination thereof and includes known circuitry for processing voice signals received from the peripherals interface 624 to enable a user to communicate in real-time with other users or system(s). In some embodiments, the audio circuitry 670 includes a headphone jack (not shown).

The peripherals interface 624 can couple various peripherals, such as the card reader 604, of the system to one or more processors 626 and the computer-readable medium 610. The one or more processors 626 can communicate with one or more computer-readable mediums 610 via a memory controller 622. The computer-readable medium 610 can be any device or medium that can store code and/or data for use by the one or more processors 626. The medium 610 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 610 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The one or more processors 626 can run various software components stored in the medium 610 to perform various functions for the electronic device 602. Note that the order of the modules in the medium 610 does not denote the order of a software stack as implemented in the medium 610. In some embodiments, the software components include an operating system 611, a communication module (or set of instructions) 612, a touch processing module (or set of instructions) 613, an interface module (or set of instructions) 615, such as the passcode interface generator module 202 of FIG. 2 or the user interface application 106 of FIG. 1, and one or more applications (or set of instructions) 618, for example, including the authentication module 216 of FIG. 2. Each of these modules and above noted applications correspond to a set of instructions for performing one or more functions described above and the methods described in this application (e.g., the computer-implemented methods and other information processing methods described herein).

These modules (e.g., sets of instructions) need not be implemented as separate software programs, procedures or modules, and thus various subsets of these modules may be combined or otherwise rearranged in various embodiments. In some embodiments, the medium 610 may store a subset of the modules and data structures identified above. Furthermore, the medium 610 may store additional modules and data structures not described above.

The operating system 611 can include various procedures, sets of instructions, software components and/or drivers for controlling and managing general system tasks (e.g., memory management, storage device control, power management, etc.) and facilitates communication between various hardware and software components.

The communication module 612 facilitates communication with other devices using the communications circuitry 650 and includes various software components for handling data received from the RF circuitry 652 and/or the port 654.

The touch processing module 613 includes various software components for performing various tasks associated with touch hardware 634 including but not limited to receiving and processing touch input received from the I/O device 630 via a touch I/O device controller 632. For example, the touch processing module 613 can also include software components for performing tasks associated with other I/O devices (not shown). In some embodiments, the touch processing may be disabled to prevent tactile contact information from being discovered by malware running on the operating system 611.

The passcode interface module 615 is configured to present and maintain a passcode interface for a user to enter a passcode to authenticate the user's identity. The passcode interface module 615 can include various known software components for rendering, animating and displaying graphical objects on a display surface. In embodiments, in which the touch hardware 634 is a touch sensitive display (e.g., touch screen), the passcode interface module 615 includes components for rendering, displaying, and animating objects on the touch sensitive display. The passcode interface module 615 can provide graphics instructions (e.g., animation or still image) to graphics I/O controller 644, so that the graphics I/O controller 644 can display the graphics on display 646. The passcode interface module 615 can further control the audio circuitry 670 to provide an auditory component to the passcode interface.

One or more applications 618 can include any applications installed on the electronic device 602, including without limitation, modules of the electronic device 200, a browser, keyboard emulation, widgets, JAVA-enabled applications, encryption, digital rights management, voice recognition, voice replication, location determination capability (such as that provided by the global positioning system (GPS)), etc.

The touch I/O controller 632 is coupled to the touch hardware 634 for controlling or performing various functions. The touch hardware 632 communicates with the processing system 620 via the touch I/O device controller 632, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 634 displays visual output to the user in a GUI. The visual output may include text, graphics, video, and any combination thereof. Some or all of the visual output may correspond to user-interface objects. The touch hardware 634 forms a touch-sensitive surface that accepts touch input from the user. The touch hardware 634 and the touch controller 632 (along with any associated modules and/or sets of instructions in the medium 610) detects and tracks touches or near touches (and any movement or release of the touch) on the touch hardware 634 and converts the detected touch input into interaction with graphical objects, such as one or more user-interface objects. In the case in which the touch hardware 634 and the display 646 are embodied as a touch screen, the user can directly interact with graphical objects that are displayed on the touch screen. Alternatively, in the case in which hardware 634 is embodied as a touch device other than a touch screen (e.g., a touch pad), the user may indirectly interact with graphical objects that are displayed on a separate display screen. In some embodiments, the touch controller 632 may be configured such that it is disabled when a passcode interface is being displayed by the display 646.

Embodiments in which the touch hardware 634 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

Feedback may be provided by the touch hardware 634 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

In some embodiments, the peripherals interface 624, the one or more processors 626, and the memory controller 622 may be implemented on a single chip. In some other embodiments, they may be implemented on separate chips. The storage 660 can be any suitable medium for storing data, including, for example, volatile memory (e.g., cache, RAM), non-volatile memory (e.g., Flash, hard-disk drive), or a both for storing data, including pages used for transition animations.

What is claimed is:

1. A method comprising:
receiving card data at a card reader mechanically connected to a mobile device, in response to use of a card at the card reader;
sending, by the card reader, a communication to cause the mobile device to display an input entry interface on a display component of the mobile device for enabling a user to enter, through multiple tactile presses applied to a surface of the mobile device, an input that is used to authenticate a transaction;
recording a sequence of accelerometer readings from an accelerometer in the card reader, wherein the accelerometer readings correspond to movements of the card reader and the mobile device when the multiple tactile presses are applied to the surface of the mobile device;
based at least in part on the accelerometer readings, determining, by the card reader, locations on the surface of the mobile device corresponding to the multiple tactile presses applied to the surface of the mobile device;

determining, based at least in part on the determined locations corresponding to the multiple tactile presses, an input entry comprised of symbols; and authenticating the transaction based at least in part on the determined input entry.

2. The method as recited in claim 1, further comprising:

receiving, by the card reader, from the mobile device, a geometric map including locations of the symbols on the input entry interface; and determining the input entry, at least in part, by matching the determined locations against the geometric map including the locations of the symbols on the input entry interface.

3. The method as recited in claim 2, wherein a first instance of the geometric map for the transaction is different from a second instance of the geometric map for a previous transaction.

4. The method as recited in claim 2, wherein determining the input entry comprises determining a respective symbol corresponding to a respective input entry based on different instances of the geometric map, each instance corresponding to one of the tactile presses.

5. The method as recited in claim 1, wherein authenticating the transaction comprises comparing, by the card reader, the input entry with a passcode accessible from the card through the card reader to verify the determined input entry via the card reader.

6. The method as recited in claim 1, wherein the display component is a touchscreen component, the method further comprising preventing recording of touch locations on the mobile device as reported by the touchscreen component when the input entry interface is displayed.

7. The method as recited in claim 1, further comprising sending, by the card reader, the input entry to an external computing device to verify the input entry, wherein no memory device in the mobile device has a record of the tactile presses.

8. An electronic device comprising:

a memory configured to store executable instructions; and a processor configured by the executable instructions to execute operations comprising:

receiving, by the electronic device, card data from a card reader mechanically connected to the electronic device;

displaying an input entry interface on a display component of the electronic device for enabling a user to enter, through multiple tactile presses applied to a surface of the electronic device, an input that is used to authenticate a transaction;

receiving a sequence of accelerometer readings from an accelerometer in the card reader, wherein the accelerometer readings correspond to movements of the card reader and the electronic device when the multiple tactile presses are applied to the surface of the electronic device;

based at least in part on the accelerometer readings from the accelerometer in the card reader, determining locations on the surface of the electronic device corresponding to the multiple tactile presses applied to the surface of the electronic device;

determining, based at least in part on the determined locations corresponding to the multiple tactile presses, an input entry comprised of input symbols; and authenticating the transaction based at least in part on the determined input entry.

9. The electronic device as recited in claim 8, the operations further comprising determining the input entry, at least in part, by matching the determined locations against a geometric map including the locations of the symbols on the input entry interface.

10. The electronic device as recited in claim 9, wherein a first instance of the geometric map for the transaction is different from a second instance of the geometric map for a previous transaction.

11. The electronic device as recited in claim 9, wherein the operation of determining the input entry comprises determining a respective input symbol corresponding to a respective input entry based on different instances of the geometric map, each instance corresponding to one of the tactile presses.

12. The electronic device as recited in claim 8, wherein authenticating the transaction comprises comparing, by the card reader, the input entry with a passcode accessible from the card through the card reader to verify the determined input entry via the card reader.

13. The electronic device as recited in claim 8, wherein the display component is a touchscreen component, the operations further comprising preventing recording of touch locations on the electronic device as reported by the touchscreen component when the input entry interface is displayed.

14. The electronic device as recited in claim 8, the operations further comprising:

determining a time window of when the input is expected; and determining the plurality of locations based on the accelerometer readings received within the time window.

15. A non-transitory computer-readable medium storing instructions which, when executed by one or more processors, configure the one or more processors to perform operations comprising:

receiving card data at a card reader mechanically connected to a mobile device, in response to use of a card at the card reader;

sending, by the card reader, a communication to cause the mobile device to display an input entry interface on a display component of the mobile device for enabling a user to enter, through multiple tactile presses applied to a surface of the mobile device, an input that is used to authenticate a transaction;

recording a sequence of accelerometer readings from an accelerometer in the card reader, wherein the accelerometer readings correspond to movements of the card reader and the mobile device when the multiple tactile presses are applied to the surface of the mobile device;

based at least in part on the accelerometer readings, determining, by the card reader, locations on the surface of the mobile device corresponding to the multiple tactile presses applied to the surface of the mobile device;

determining, based at least in part on the determined locations corresponding to the multiple tactile presses, an input entry comprised of symbols; and authenticating the transaction based at least in part on the determined input entry.

16. The non-transitory computer-readable medium as recited in claim 15, the operations further comprising:

receiving, by the card reader, from the mobile device, a geometric map including locations of the symbols on the input entry interface; and determining the input entry, at least in part, by matching the determined locations against the geometric map including the locations of the symbols on the input entry interface.

17. The non-transitory computer-readable medium as recited in claim 16, wherein a first instance of the geometric map for the transaction is different from a second instance of the geometric map for a previous transaction.

18. The non-transitory computer-readable medium as recited in claim 15, wherein authenticating the transaction comprises comparing, by the card reader, the input entry with a passcode accessible from the card through the card reader to verify the determined input entry via the card reader.

19. The non-transitory computer-readable medium as recited in claim 15, wherein the display component is a touchscreen component, the operations further comprising preventing recording of touch locations on the mobile device as reported by the touchscreen component when the input entry interface is displayed.

20. The non-transitory computer-readable medium as recited in claim 15, the operations further comprising sending, by the card reader, the input entry to an external computing device to verify the input entry, wherein no memory device in the mobile device has a record of the tactile presses.

* * * * *